Patented Dec. 4, 1934

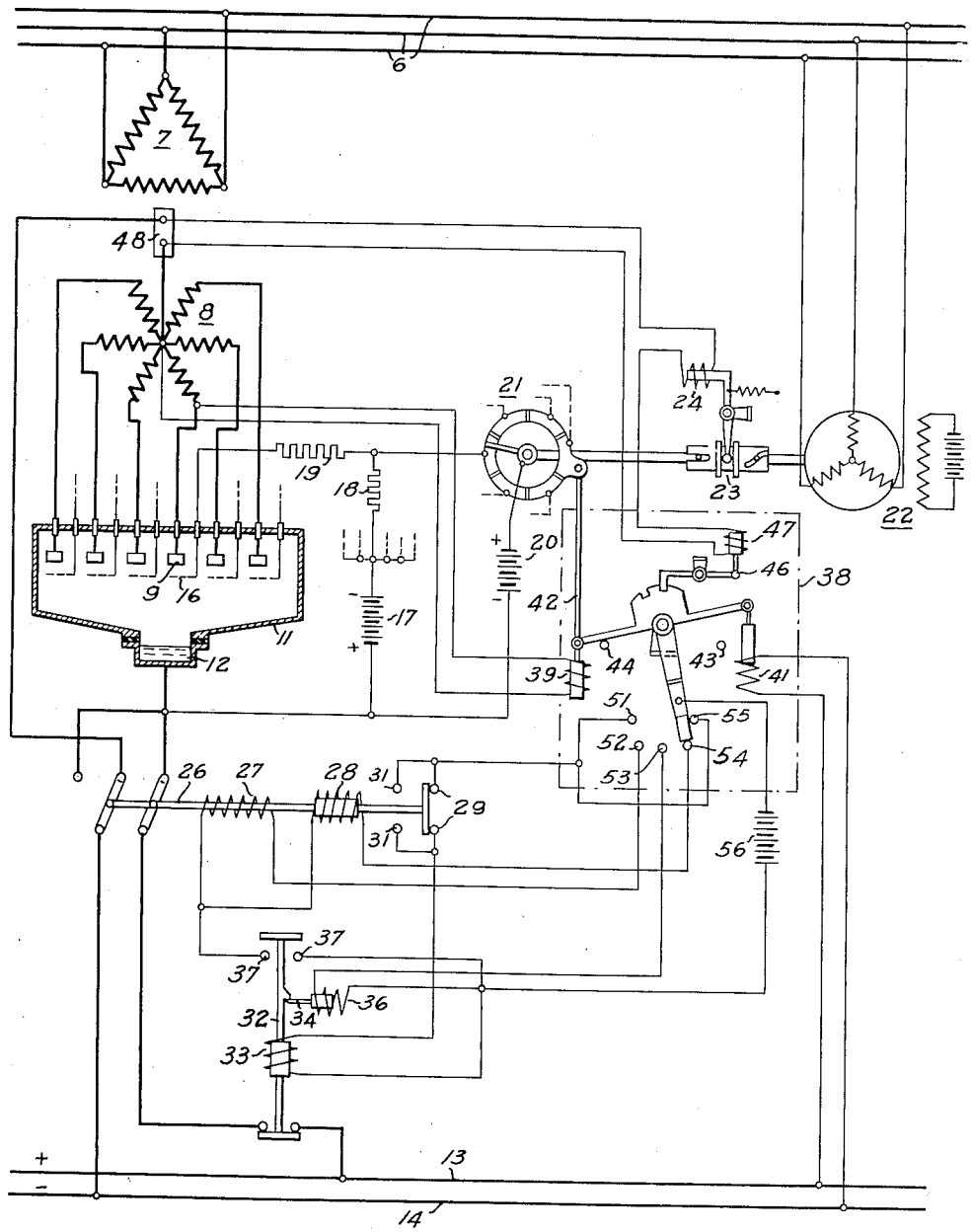

1,983,204

UNITED STATES PATENT OFFICE 1,983,204

RECTIFIER CONTROL SYSTEM

Stefan Widmer and Gustav Brunner, Baden, Switzerland, assignors to Aktiengesellschaft Brown Boveri & Cie., Baden, Switzerland, a joint-stock company of Switzerland Application November 25, 1932, Serial No. 644,283
In Germany December 29, 1931

12 Claims. (Cl. 175—363)

This invention relates to improvements in electric current rectifying systems employing an electron discharge device and more particularly to control means for permitting operation of the device alternately as an alternating current rectifier and as a direct current inverter.

It is well known to supply a direct current distribution line from an alternating current supply line through a system employing an electron discharge device controlled for operation as an alternating current rectifier. It is frequently desired to also permit the transfer, to the alternating current line in such system, of energy produced by generators connected with the distribution line when such energy is in excess of the amount which may be utilized by current consuming devices connected with the distribution line. Such production of excess energy is frequent in systems in which a direct current line supplies the motors of electric vehicles when the motors of a vehicle operate as generators for regenerative braking thereof and therefore return energy to the line in excess of the amount required for the operation of other vehicles supplied from the same line. Such return of energy to the alternating current line is not possible through an ordinary rectifying system using an electron discharge device unless the polarity of the direct current line be first reversed. By providing means for reversing the connections of the electron discharge device with the direct current line and for simultaneously adjusting the control means of the device in response to line conditions, the system may operate to return energy to the alternating current line without reversing the polarity of the direct current line.

It is, therefore, among the objects of the present invention to provide a control system for a rectifying system employing an electron discharge device in which such device may be made to operate either as an alternating current rectifier or as a direct current inverter.

Another object of the present invention is to provide a control system for a rectifying system employing an electron discharge device in which such device is automatically connected to operate as an alternating current rectifier or as a direct current inverter in response to the relative conditions in the alternating current line and in the direct current line.

Another object of the present invention is to provide a control system for a rectifying system employing an electron discharge device in which such device is connected to operate as an alternating current rectifier or as a direct current inverter without reversing the polarity of the direct current line.

Objects and advantages other than those above set forth will be apparent from the following description when read in connection with the drawing which diagrammatically illustrates one embodiment of the present invention whereby an electron discharge device of the vapor arcing type provided with control electrodes energized through a synchronous distributor may be operated as an alternating current rectifier or as a direct current inverter in response to the relative values of the voltages in the alternating current line and in the direct current line connected therewith.

Referring more particularly to the drawing by characters of reference, reference numeral 6 designates an alternating current line herein illustrated as a three-phase line for the reason that such type of line is most frequently employed in practice. Line 6 is connected with the delta connected primary winding 7 of a transformer having a secondary winding 8 comprising a plurality of winding portions connected in star to form a neutral point. The different portions of winding 8 are severally connected with the anodes such as 9 of an electron discharge device 11 operable either as an alternating current rectifier and as a direct current inverter. Device 11 is herein shown as being of the metallic vapor arcing type and is assumed to be provided with the usual ignition and excitation means (not shown). It will be understood, however, that device 11 may be of any other type known in the art and in which the flow of current is regulated by means of control electrodes. Device 11 is shown as provided with a cathode 12 which, during operation of such device as a rectifier, is connected with the positive conductor 13 of a direct current line having the negative conductor 14 thereof connected with the neutral point of winding 8.

Device 11 is provided with a plurality of control electrodes such as 16 which are generally maintained at a negative potential with respect to the potential of cathode 12 by means of a battery 17 through resistances such as 18 and 19. The control electrodes may also be energized at a positive potential with respect to the potential of cathode 12 by means of a battery 20 through the segments of a distributor 21 operated in synchronism with the voltage of line 6. The brush of distributor 21 is preferably rotated by means of a synchronous motor 22 energized from line 6 and may be connected therewith through a variable coupling 23 to permit adjustment of the angular position of such brush with respect to the position of the rotor of motor 22. Adjustment of coupling 23 may be obtained manually and may also be obtained in response to the variations of an electrical quantity by means of a solenoid 24 producing an axial displacement of the coupling member.

The connections between device 11 and line 13, 14 may be reversed by means of a reversing switch 26 herein shown as consisting of a mechanical switching member but which may be of any type known in the art and may be replaced by a plurality of electron discharge devices operable as electric valves. As will appear hereinafter, switch 26 operates only when the circuit of device 11 is open and is, therefore, not required to interrupt current. The position of switch 26 is determined by energization of one of a pair of actuating coils 27 or 28 and results in bridging of either of two pairs of contacts 29 or 31. The direct current circuit of device 11 may be opened by a circuit breaker 32 provided with a closing coil 33 and with a latch 34 which permits opening of the circuit breaker upon energization of a trip coil 36. Circuit breaker 32 is provided with auxiliary contacts 37 which are connected by a bridging member when the circuit breaker is in the open position thereof. The operation of the system is controlled by means of a relay 38 provided with two operating coils 39 and 41 acting in opposite directions on the armature thereof. Coil 39 may be energized from one of the portions of winding 8 while coil 41 is energized from line 13, 14. The dimensions of coils 39 and 41 are so adjusted that, when there is no transfer of energy between lines 6 and 13, 14, such coils have equal actions. As is well known, when line 6 supplies energy to line 13, 14, the voltage drops occurring within the system will affect the voltage of line 13, 14 to a greater extent than the voltages of winding 8 so that the action of coil 41 then becomes less than the action of coil 39. The reverse action occurs upon transfer of energy from line 13, 14 to line 6 and relay 38 then tends to reverse its position.

Relay 38 is connected with the segments of distributor 21 by means of a connecting rod 42. By means of such connection, when relay 38 is in the position shown, distributor 21 is properly adjusted to permit operation of device 11 as a rectifier, and when relay 38 has reversed its position, distributor 21 is properly adjusted to permit operation of device 11 as an inverter. The operating positions of relay 38 must therefore be accurately established by suitable means such as stops 43 and 44. Operation of relay 38 is prevented during such times when device 11 is carrying current by means of a latch 46 which is maintained in engaged position with the armature by a coil 47 preferably connected in series with coil 24. Coils 24 and 47 are energized in response to the current flowing through device 11 by suitable means such as a shunt 48 connected with the negative conductor 14 of the direct current line. Relay 38 is provided with contacts 51, 52, 53, 54 and 55 to permit energization of coils 26, 27, 33 and 36 from a battery 56 as will appear from a description of the operation of the system.

In operation, assuming the system to be connected as shown and line 6 to be energized, winding 7 is energized from such line with the result that winding 8 supplies six-phase alternating voltages to the anodes of device 11. It is assumed that line 13, 14 is connected with current consuming devices which require an amount of energy in excess of the output of any generators connected with such line, so that energy is supplied from line 6 to line 13, 14 through device 11 operating as a rectifier. Under such conditions, the action of coil 39 of relay 38 is greater than the action of coil 41 thereof and the relay tends to remain in the position shown. As is well known, the control electrodes of device 11, being negatively energized from battery 17, prevent the flow of current through the associated anodes and, upon being sequentially energized at a positive potential by means of distributor 21, each control electrode permits the flow of current through the associated anode for a period of time equal to one-sixth of a cycle of the voltage of line 6 due to the particular connection of transformer 7, 8 herein illustrated. Such sequential energization is repeated during each cycle of the voltage of line 6 to permit flow of a substantially uniform direct current through line 13, 14. The relation between the current supplied by device 11 and the output voltage thereof is controlled by coil 24 which adjusts coupling 23 with the result that, for any value of current flowing through shunt 48, coupling 23 takes a predetermined position thereby adjusting the position of the brush of distributor 21 to regulate the output voltage of device 11 to a predetermined value. During such flow of energy, coil 47 remains energized and latch 46 constantly engages with the armature of relay 38, thereby preventing reversal thereof even upon any changes in the relation between the voltages of winding 8 and of line 13, 14.

Assuming that the flow of energy between the alternating current and direct current lines ceases, coil 47 is deenergized and releases latch 46 which disengages from the armature of relay 38. Assuming that the output of the generators (not shown) connected with line 13, 14 becomes such as to be in excess of the requirement of the loads connected therewith, such generators will cause the voltage of line 13, 14 to rise above the value of such voltage corresponding to the no load condition of device 11. The action of coil 41 then becomes greater than the action of coil 39 and relay 38 reverses the position of the armature thereof, thereby reversing the position of the segments of distributor 21 to permit operation of device 11 as an inverter. During such reversal of relay 38 such relay first disengages from contacts 55 and 54 to open the circuits of coils 33 and 28. Relay 38 then engages with contact 53 thereby closing a circuit from battery 56 over contact 53 to trip coil 36. Trip coil 36 being energized withdraws latch 34 and circuit breaker 32 opens, thereby interrupting the circuit of device 11 and closing auxiliary contacts 37. Relay 38 then engages with contact 52, thereby closing a circuit from battery 56 over contact 52, coil 27 and contacts 37. Coil 27 being thus energized causes reversal of switch 26 thereby connecting device 11 with line 13, 14 in the reverse connection from those illustrated to permit operation of such device as an inverter. Completion of the reversal of relay 38 causes engagement with contact 51 to permit energization of closing coil 33 of circuit breaker 32 from battery 56 over either of contacts 29 or 31, but such energization is possible only when switch 26 is in one of the operating positions thereof so that switch 26 cannot be required to carry current until the reversing operation thereof is fully completed. Closing coil 33 will therefore be energized through contact 51 only upon closure of contacts 31 by means of circuit breaker 26. Device 11 is then operable to transfer energy from line 13, 14 to line 6, the flow of such energy being controlled by the action of the control electrodes in a manner similar to that outlined above regarding the operation of device 11 as a rectifier. Current then flows in shunt 48 and coil 47 is again energized, thereby attracting latch 46 which engages with the armature of relay 38 to prevent further operation of such relay as long as device 11 is carrying current. Coil 24 also receives current from shunt 48 and causes adjustment of coupling 23 to control the relation between the current of device 11 and the output voltage thereof as is the case when such device operates as a rectifier.

When the current in device 11 again decreases to zero and the voltage of line 13, 14 decreases below the value of such voltage when device 11 carries no current, relay 38 again reverses the armature thereof to the position shown in the drawing. Such reversal causes opening of circuit breaker 32, reversing of switch 26 and reclosing of circuit breaker 32 simultaneously with reversal of distributor 21 in a manner similar to that described above. The system then being returned into the position illustrated will again operate for transmitting energy from line 6 to line 13, 14 as described above.

Although but one embodiment of the present invention has been illustrated and described, it will be apparent to those skilled in the art that various changes and modifications may be made therein without departing from the spirit of the invention or from the scope of the appended claims.

It is claimed and desired to secure by Letters Patent:

1. In an electron discharge device control system, an alternating current line, an electron discharge device having anodes with associated control electrodes and a cathode, a transformer connecting the anodes with the line, means for applying a potential to the control electrodes to control operation of the anodes of said device, a direct current line, one of the conductors of said direct current line being connected with the cathode of said device and the other conductor thereof being connected with said transformer, means for interrupting said direct current line, means for reversing the connections of said direct current line, and means for controlling operation of the last two said means in response to the relative potential conditions of said lines.

2. In an electron discharge device control system, an alternating current line, an electron discharge device having anodes with associated control electrodes and a cathode, a transformer connecting the anodes with the line, means for applying a potential to the control electrodes to control operation of the anodes of said device, a direct current line, one of the conductors of said direct current line being connected with the cathode of said device and the other conductor thereof being connected with said transformer, means responsive to the potential conditions of said direct current line to vary operation of the first said means, means for interrupting said direct current line, means for reversing the connections of said direct current line, and means for controlling operation of the last two said means in response to the relative potential conditions of said lines.

3. In an electron discharge device control system, an alternating current line, an electron discharge device having anodes with associated control electrodes and a cathode, a transformer connecting the anodes with the line, a source of potential negative with respect to the potential of the cathode of said device and connected with the control electrodes thereof, means for controlling the effect of said source on the control electrodes to control operation of the anodes of said device, a direct current line, one of the conductors of said direct current line being connected with the cathode of said device and the other conductor thereof being connected with said transformer, means for interrupting said direct current line, means for reversing the connections of said direct current line, and means for controlling operation of the last two said means in response to the relative potential conditions of said lines.

4. In an electron discharge device control system, an alternating current line, an electron discharge device having anodes with associated control electrodes and a cathode, a transformer connecting the anodes with the line, a source of potential negative with respect to the potential of the cathode of said device and connected with the control electrode thereof, means for controlling the effect of said source on the control electrodes to control operation of the anodes of said device, a direct current line, one of the conductors of said direct current line being connected with the cathode of said device and the other conductor thereof being connected with said transformer, means responsive to the potential conditions of said direct current line to vary operation of the first said means, means for interrupting said direct current line, means for reversing the connections of said direct current line, and means for controlling operation of the last two said means in response to the relative potential conditions of said lines.

5. In an electron discharge device control system, an alternating current line, an electron discharge device having anodes with associated control electrodes and a cathode, a transformer connecting the anodes with the line, a source of potential negative with respect to the potential of the cathode of said device and connected with the control electrodes thereof, a source of potential positive with respect to the potential of the cathode of said device, a distributor for connecting the second said source with the control electrodes to control operation of the anodes of said device, a direct current line, one of the conductors of said direct current line being connected with the cathode of said device and the other conductor thereof being connected with said transformer, means for interrupting said direct current line, means for reversing the connections of said direct current line, and means for controlling operation of the last two said means in response to the relative potential conditions of said lines.

6. In an electron discharge device control system, an alternating current line, an electron discharge device having anodes with associated control electrodes and a cathode, a transformer connecting the anodes with the line, a source of potential negative with respect to the potential of the cathode of said device and connected with the control electrodes thereof, a source of potential positive with respect to the potential of the cathode of said device, a distributor for connecting the second said source with the control electrodes to control operation of the anodes of said device, a direct current line, one of the conductors of said direct current line being connected with the cathode of said device and the other conductor thereof being connected with said transformer, means responsive to the potential conditions of said direct current line to vary operation of said distributor, means for interrupting said direct current line, means for reversing the connections of said direct current line, and means for controlling operation of the last two said means in response to the relative potential conditions of said lines.

7. In an electron discharge device control system, an alternating current line, an electron discharge device having anodes with associated control electrodes and a cathode, a transformer connecting the anodes with the line, a source of potential negative with respect to the potential of the cathode of said device and connected with the control electrodes thereof, a source of potential positive with respect to the potential of the cathode of said device, a distributor for connecting the second said source with the control electrodes to control operation of the anodes of said device, a motor connected with said alternating current line, a variable coupling connecting said distributor with said motor, a direct current line, one of the conductors of said direct current line being connected with the cathode of said device and the other conductor thereof being connected with said transformer, means responsive to the potential conditions of said direct current line to adjust said coupling, means for interrupting said direct current line, means for reversing the connections of said direct current line, and means for controlling operation of the last two said means in response to the relative potential conditions of said lines.

8. In an electron discharge device control system, an alternating current line, an electron discharge device having anodes with associated control electrodes and a cathode, a transformer connecting the anodes with the line, a source of potential negative with respect to the potential of the cathode of said device connected with the control electrodes thereof, a source of potential positive with respect to the potential of the cathode of said device, a distributor for connecting the second said source with the control electrodes to control operation of the anodes of said device, a motor connected with said alternating current line, a variable coupling connecting said distributor with said motor, a direct current line, one of the conductors of said direct current line being connected with the cathode of said device and the other conductor thereof being connected with said transformer, a solenoid connected with said direct current line and responsive to potential conditions therein to adjust said coupling, means for interrupting said direct current line, means for reversing the connections of said direct current line, and means for controlling operation of the last two said means in response to the relative potential conditions of said lines.

9. In an electron discharge device control system, an alternating current line, an electron discharge device having anodes with associated control electrodes and a cathode, a transformer connecting the anodes with the line, means for applying a potential to the control electrodes to control operation of the anodes of said device, a direct current line, one of the conductors of said direct current line being connected with the cathode of said device and the other conductor thereof being connected with said transformer, a circuit breaker for interrupting said direct current line, a switch for reversing the connections of said direct current line, and a relay for controlling operation of said circuit breaker and said switch in response to relative potential conditions in said lines.

10. In an electron discharge device control system, an alternating current line, an electron discharge device having anodes with associated control electrodes and a cathode, a transformer connecting the anodes with the line, means for applying a potential to the control electrodes to control operation of the anodes of said device, a direct current line, one of the conductors of said direct current line being connected with the cathode of said device and the other conductor thereof being connected with said transformer, a circuit breaker for interrupting said direct current line, a switch for reversing the connections of said direct current line, a relay for controlling operation of said circuit breaker and said switch in response to relative potential conditions in said lines, and a latch arranged to control operation of said relay in response to potential conditions in said direct current line.

11. In an electron discharge device control system, an alternating current line, an electron discharge device having anodes with associated control electrodes and a cathode, a transformer connecting the anodes with the line, means for applying a potential to the control electrodes to control operation of the anodes of said device, a direct current line, one of the conductors of said direct current line being connected with the cathode of said device and the other conductor thereof being connected with said transformer, a circuit breaker for interrupting said direct current line, a switch for reversing the connections of said direct current line, and a relay for sequentially controlling disconnecting and reversing operation of said circuit breaker and said switch respectively in response to relative potential conditions in said line, said circuit breaker and said switch having auxiliary contacts cooperating with said relay to sequentially control reversing and connecting operation of said switch and said circuit breaker respectively.

12. In an electron discharge device control system, an alternating current line, an electron discharge device having anodes with associated control electrodes and a cathode, a transformer connecting the anodes with the line, means for applying a potential to the control electrodes to control operation of the anodes of said device, a direct current line, one of the conductors of said direct current line being connected with the cathode of said device and the other conductor thereof being connected with said transformer, an electromagnetically operated circuit breaker for interrupting said direct current line, an electromagnetically operated switch for reversing the connections of said direct current line, a source of current, and a relay for sequentially controlling disconnecting and reversing operation of said circuit breaker and said switch respectively in response to relative potential conditions in said line by severally controlling connection of said source with the operating means of said circuit breaker and of said switch, said circuit breaker and said switch having auxiliary contacts cooperating with said relay to sequentially control reversing and connecting operation of said switch and said circuit breaker respectively.

STEFAN WIDMER.
GUSTAV BRUNNER.